Figure 8:
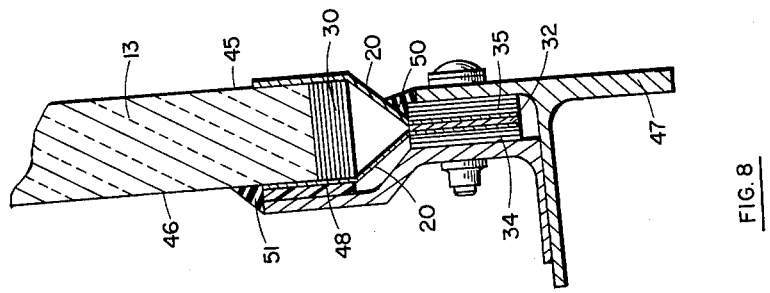

July 5, 1966  A. P. MARTIGNONI ETAL  3,259,345
ENCLOSURE METHOD AND MEANS
Filed Oct. 11, 1963  9 Sheets-Sheet 1
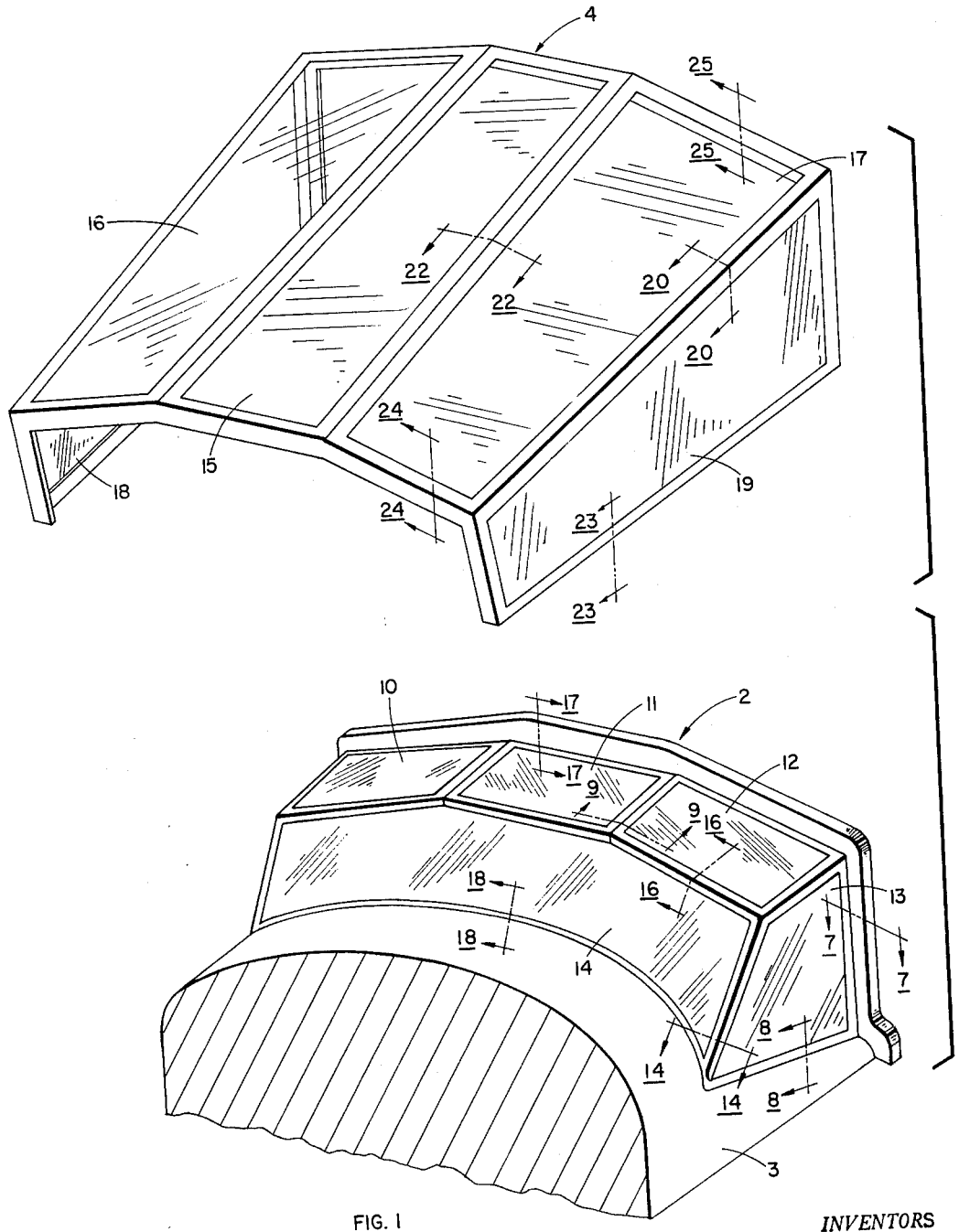
FIG. 1
INVENTORS
ANGELO P. MARTIGNONI, LESTER G. HALL
FREDERICK T. MCQUILKIN, JOHN R. BOETTO
HUGH G. MAXWELL, ROBERT B. MEADOWS
LEON PATTERSON
BY   ATTORNEY July 5, 1966 A. P. MARTIGNONI ETAL 3,259,345
ENCLOSURE METHOD AND MEANS
Filed Oct. 11, 1963 9 Sheets-Sheet 2
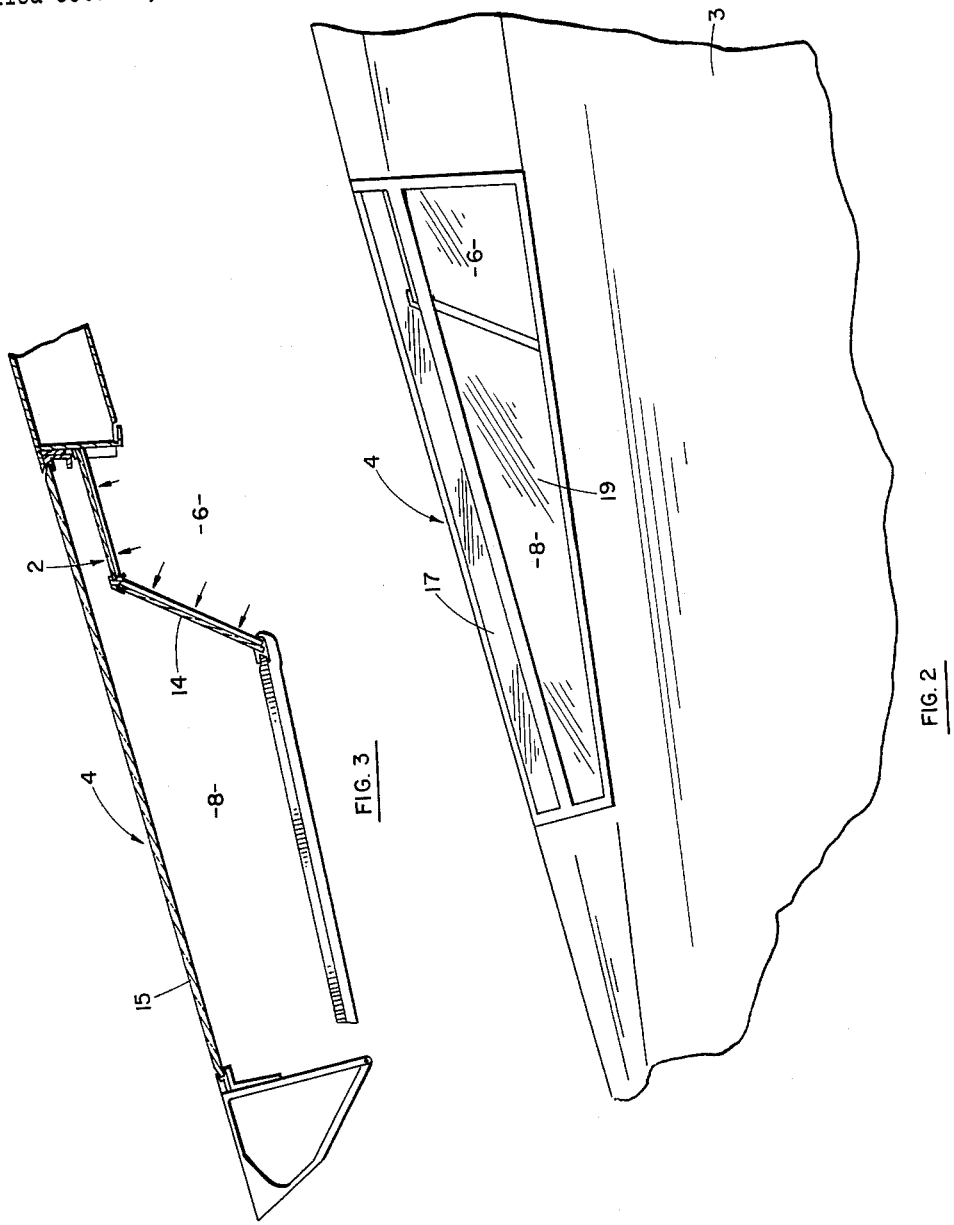
INVENTORS
ANGELO P. MARTIGNONI, LESTER G. HALL
FREDERICK T. MCQUILKIN, JOHN R. BOETTO
HUGH G. MAXWELL, ROBERT B. MEADOWS
LEON PATTERSON
BY
ATTORNEY

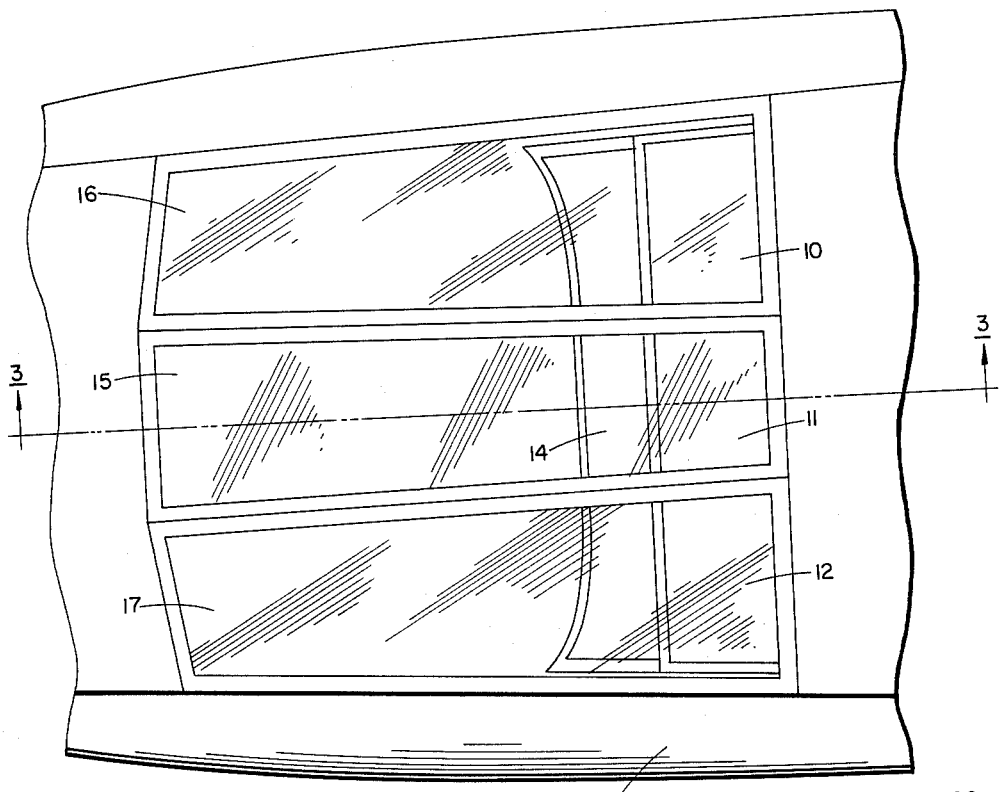
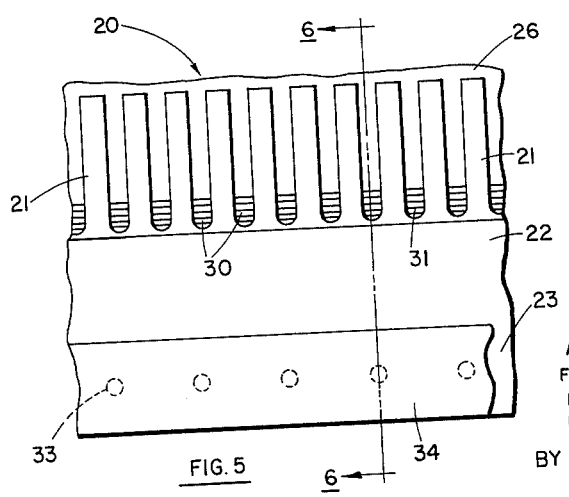
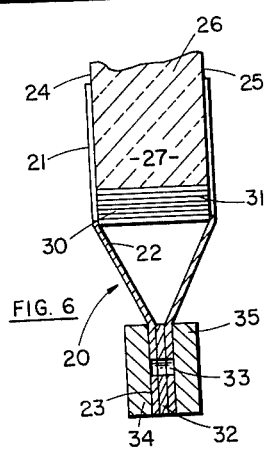

July 5, 1966  A. P. MARTIGNONI ETAL  3,259,345
ENCLOSURE METHOD AND MEANS

Filed Oct. 11, 1963                                    9 Sheets-Sheet 4

INVENTORS
ANGELO P. MARTIGNONI, LESTER G. HALL
FREDERICK T. MCQUILKIN, JOHN R. BOETTO
HUGH G. MAXWELL, ROBERT B. MEADOWS
LEON PATTERSON
BY
ATTORNEY

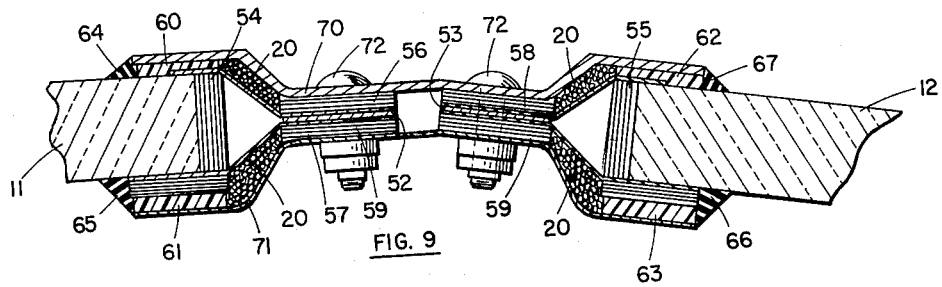
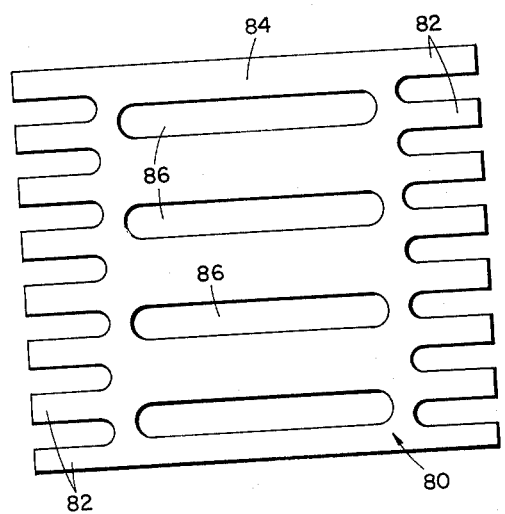
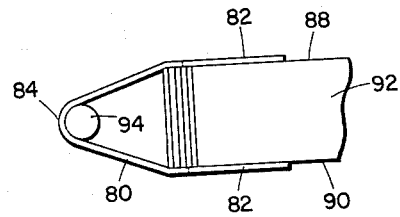
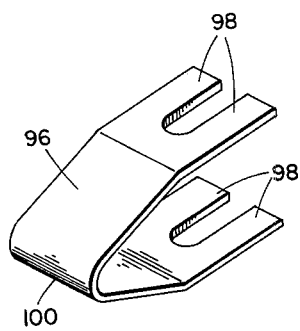
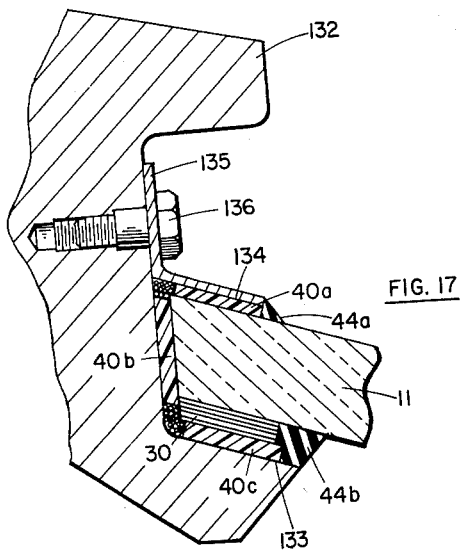

INVENTORS
ANGELO P. MARTIGNONI, LESTER G. HALL
FREDERICK T. MCQUILKIN, JOHN R. BOETTO
HUGH G. MAXWELL, ROBERT B. MEADOWS
LEON PATTERSON
BY
ATTORNEY

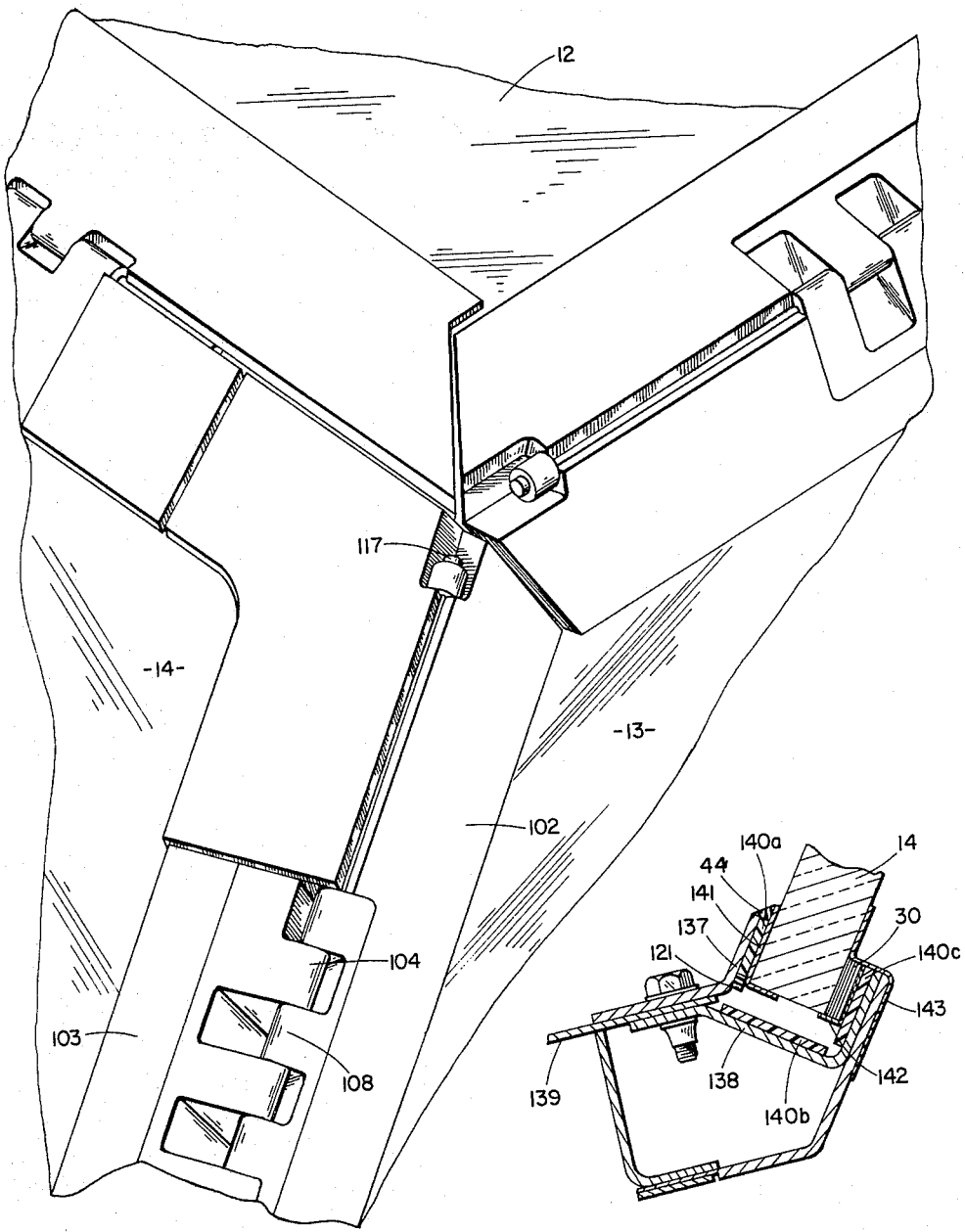

July 5, 1966  A. P. MARTIGNONI ETAL  3,259,345
ENCLOSURE METHOD AND MEANS
Filed Oct. 11, 1963  9 Sheets-Sheet 9

INVENTORS
ANGELO P. MARTIGNONI, LESTER G. HALL
FREDERICK T. MCQUILKIN, JOHN R. BOETTO
HUGH G. MAXWELL, ROBERT B. MEADOWS
LEON PATTERSON
BY  *Harold H Cauley*
ATTORNEY 3,259,345
ENCLOSURE METHOD AND MEANS
Angelo P. Martignoni, Inglewood, Lester G. Hall, Lancaster, Frederick T. McQuilkin, Los Angeles, John R. Boetto, Torrance, Hugh G. Maxwell, Palos Verdes, Robert B. Meadows, Torrance, and Leon Patterson, Los Alamitos, Calif., assignors to North American Aviation, Inc.
Filed Oct. 11, 1963, Ser. No. 315,535
24 Claims. (Cl. 244—129)

This invention concerns improved enclosure means, particularly as formed by one or more panels arranged and mounted to provide strong, lightweight structure capable of forming a temperature and pressure barrier. This invention is especially applicable to construction of pressurized cabins forming crew enclosure means for ultra-high speed vehicles and relates particularly to the transparent surfaces comprising the windshield or canopy in such vehicles.

The invention disclosed herein is broadly applicable to structural panels loaded in a plurality of directions, in a wide variety of shapes or locations, and in any type of vehicle. However, a particular need for this invention arose in connection with pressurized crew enclosure means in ultra high speed type aerial and space vehicles, wherein the techniques, designs, and materials formerly employed for conventional supersonic aircraft are often unsatisfactory. Structure used in vehicles of the instant type must be capable of withstanding the extreme temperatures and stresses encountered during operation of the vehicle. For example, the windshield used in conventional supersonic aircraft typically comprises a smooth surafce of glass and plastic laminate mounted forward of the cockpit with a rearward slope to reduce drag during flight, and also serves as a pressure barrier between the internal pressurized cabin area and the external atmosphere. Since the optical qualities of a windshield are adversely affected by sloping thereof, it is common practice in the prior art to limit the stated slope as may be necessary to preserve reasonably clear and accurate optical qualities. The precise amount of windshield slope thus represents a compromise based upon consideration of opposing drag and optical effects.

The adverse optical effects mentioned above are more severe in the case of laminated windshields than with the monolithic or single layer type. For example, when a distant object is viewed through a transparent panel of laminated construction having chemically dissimilar media in the various laminae, the image of such object will be displaced by an amount depending upon the angles of refraction of the various media. Therefore, the observer's view will differ from the true location of the object by an amount depending upon the extent of image displacement. The refraction effects in a laminated panel are considerably aggravated by tilting the panel in the manner of a windshield to lessen drag. In view of the stated factors, monolithic plexiglass would be optically superior to laminated panels for use in cockpit enclosures involving sloped surfaces. Unfortunately, however, plexiglass has relatively little strength, especially at temperatures in excess of 100° F., and large sections of such material cannot safely be loaded as by pressurization of such enclosures.

In addition to the detrimental visual effects described above, any increase in the angle of windshield slope away from a vertical plane is necessarily accompanied by an increase in the area of the windshield surface, since greater length is required to accommodate the stated change of slope. Such increase in length requires stronger windshield material, to resist bending loads imposed upon the material by pressurization of the cockpit. Since the windshield in effect forms a wall of the pressurized crew enclosure and its external surface may be exposed to ambient atmospheric conditions including the low pressure occurring at high altitude, differential pressure across the windshield during cockpit pressurization in the conventional arrangement imposes considerable bending loads on panels which form the same. As stated above, monolithic glass has superior optical qualities compared to other windshield materials, but is structurally weak and unable to bear high bending loads, especially at elevated temperatures. Therefore, resort has been made to stronger panels such as glass and silicone laminates which are both fragile and heavy. In a vehicle of the type here involved, a windshield of the laminated type severely sloped to produce relatively low drag would require tremendous area having a prohibitively high weight for aircraft use, in addition to its inferior optical qualities.

In addition to the limitations referred to above, windshields constructed of various laminates of glass, plastic, or other materials having improved strength and resistance to temperature present formidable mounting problems due to the inability of such panels to withstand bearing loads such as would result from bolts penetrating the panel edge. Therefore, attempts have been made to use various alternative panel fastening means including the provision of metal flanges clamped to the periphery of the panel and extending outwardly therefrom for attachment to adjacent framework. The use of metal joinder means in windshields known to the prior art is limited to installations involving sufficiently low temperatures and pressures to avoid structural failure of the windshield due to differing rates of thermal expansion between the glass or other laminate material and the metal frame. In conventional edge attachments of the metallic type, thermal characteristics of glass and metal are sufficiently dissimilar as to cause loosening or separation of the windshield panels from their mounting structure at high temperatures even without external force applied to such panels, or excessive compression force on the panel edges which would cause shattering of the panel along its edges.

Also, edge attachment means for panels of the stated type in many installations are subjected to tension loads as well as bending loads at joints between the panel material and the edge retaining elements. Where flat panels are joined at their edges to form an angle between such panels enclosing a pressurized area, the tension and bending loads at such joints are particularly acute. Where pressure within the enclosed area is high, as in crew enclosures for vehicles of the type to which this invention relates, the loads on windshield and canopy panel joints are especially great.

In vehicles of the ultra high speed type with which the instant invention is concerned, the elevated temperatures and extreme pressure encountered during vehicle operation as discussed above constitute severe factors not previously involved in the design of cabin enclosure means and selection of materials therefor. Windshields known to the prior art are critically inadequate to meet the new demands of modern space vehicle applications, and their use with high cabin to environment temperature and pressure differentials would be dangerously impractical and from a design standpoint utterly unfeasible. The invention disclosed herein was devised to meet the particularly difficult design, fabrication and operational requirements of cabin structure in a vehicle of the class mentioned.

Accordingly, it is a principal object in this case to provide transparent panel structure forming improved pressurized crew enclosure means for use in ultra high speed type vehicles.

It is a further object of this invention to provide structure as set forth in the above object having improved strength and optical qualities.

It is an additional object in this case to provide structure as set forth in the above objects having improved aerodynamic properties and lighter weight.

It is also an object in this case to provide improved mounting means for securing panels such as referred to in the objects set forth above to adjacent structure to form a pressure barrier of improved strength and economy of weight.

Also, it is an object of the invention disclosed herein to provide an improved arrangement of panels forming a lightweight pressure barrier in vehicles having relatively high pressure areas internally and relatively high temperatures on the outer surfaces of such vehicles during operation thereof.

It is an additional object in this case to provide improved mounting means such as referred to in the objects stated above which are permanently secured to panels such as referred to in the objects stated above in such relationship as to prevent chipping or other damage to the edges of such panels during shipment and handling thereof.

Figure 7:
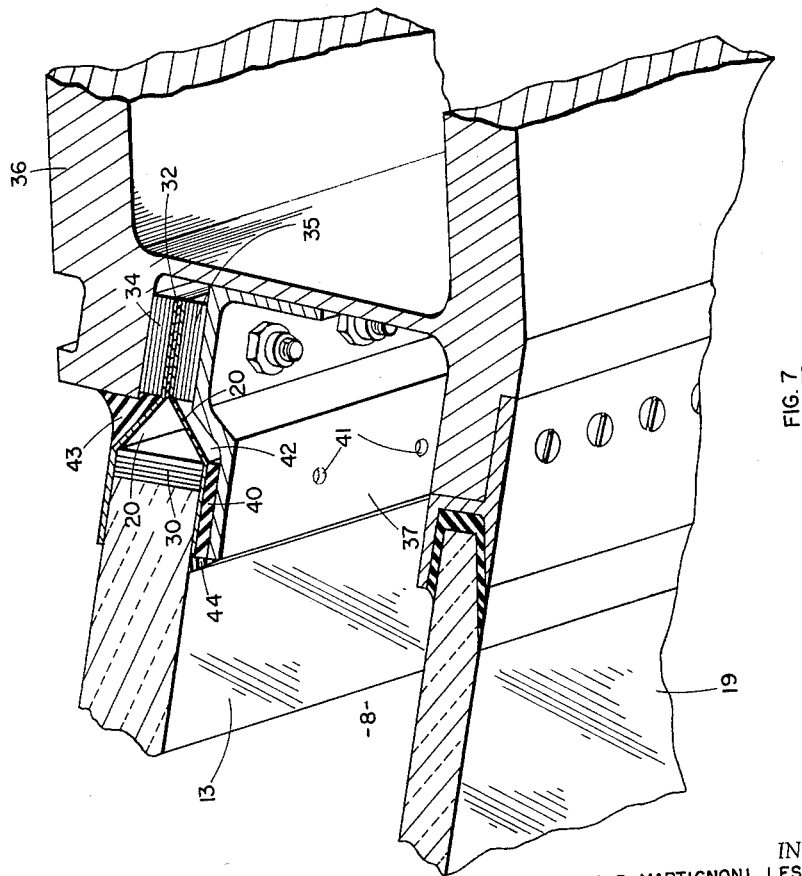
Figure 13:
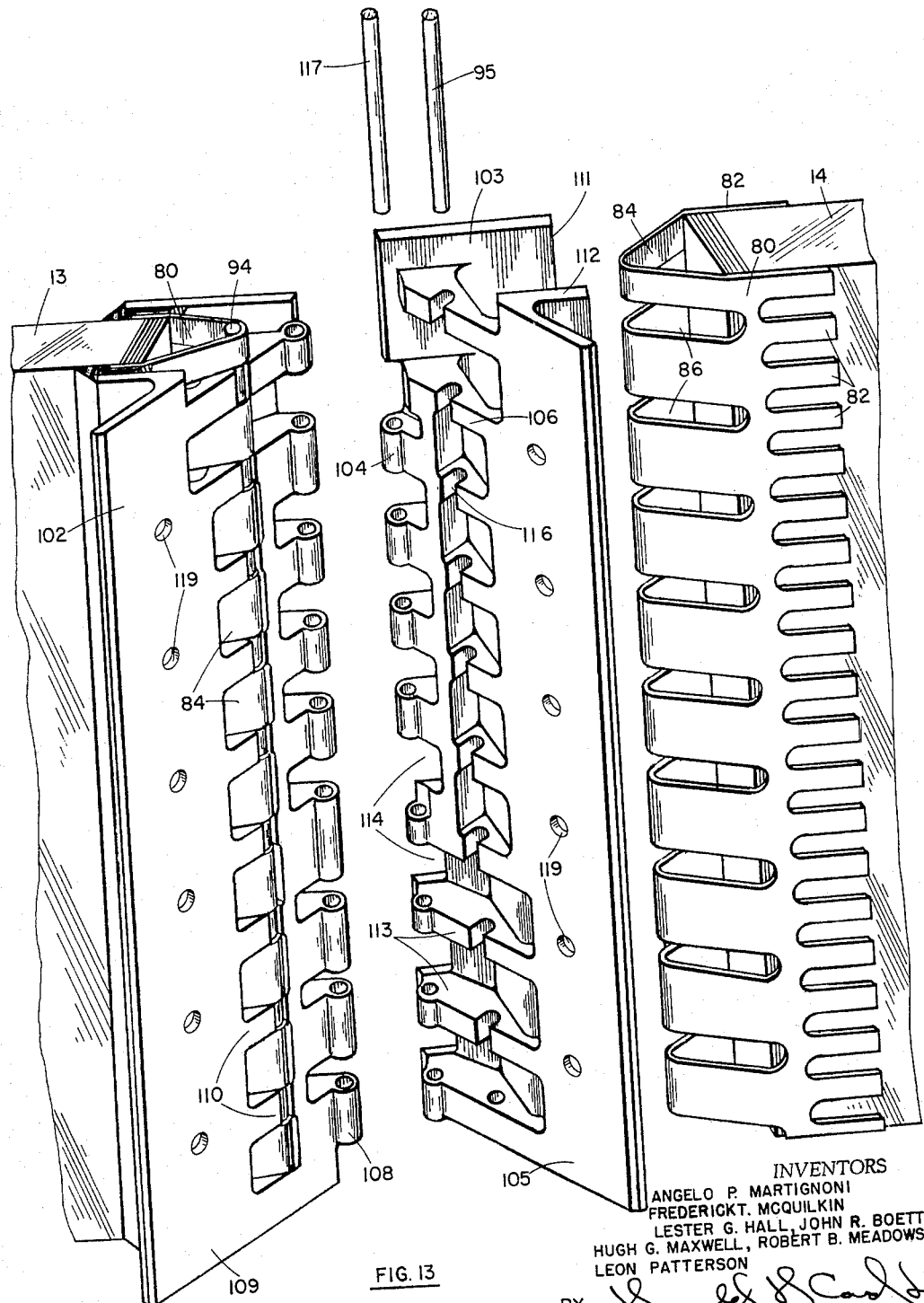
Figure 14:
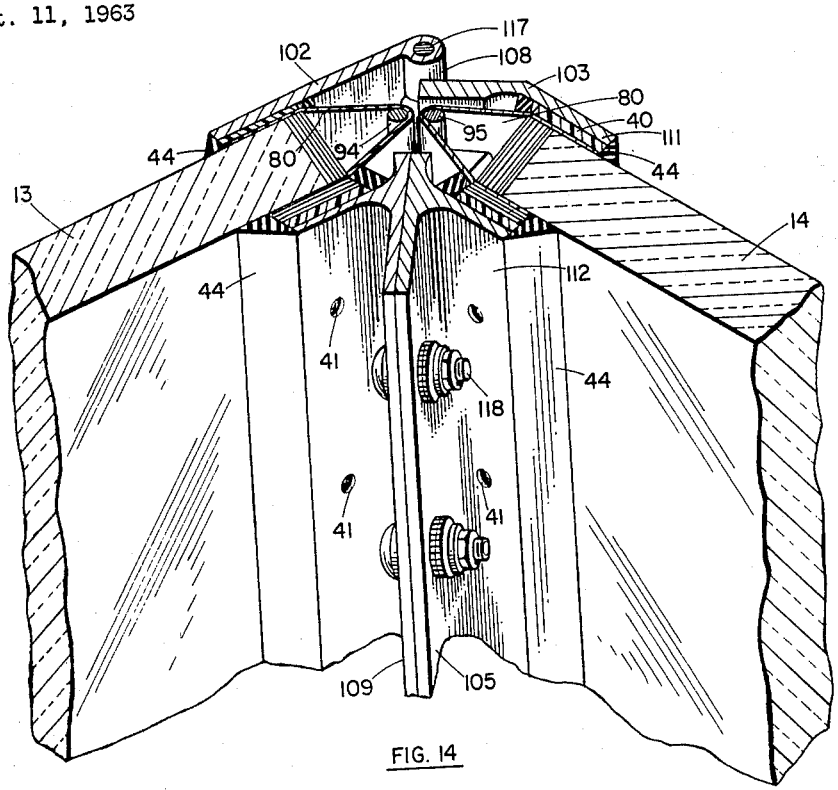
Figure 16:
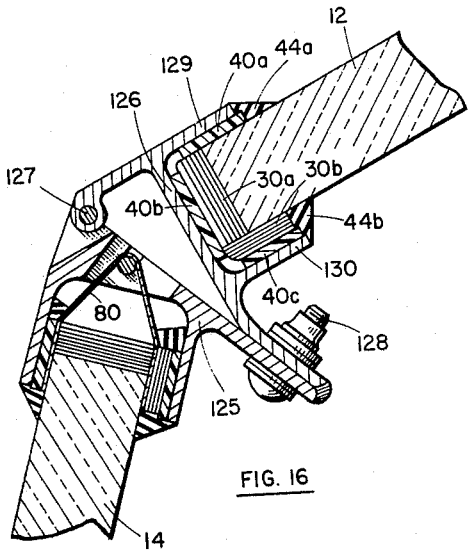
Figure 15:
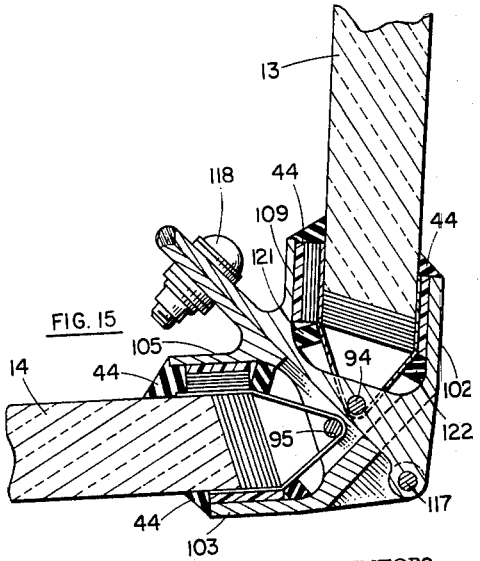
Figure 20:
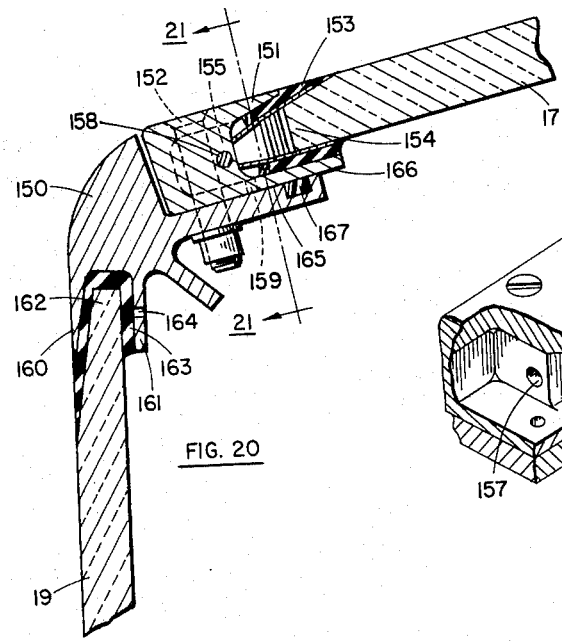
Figure 21:
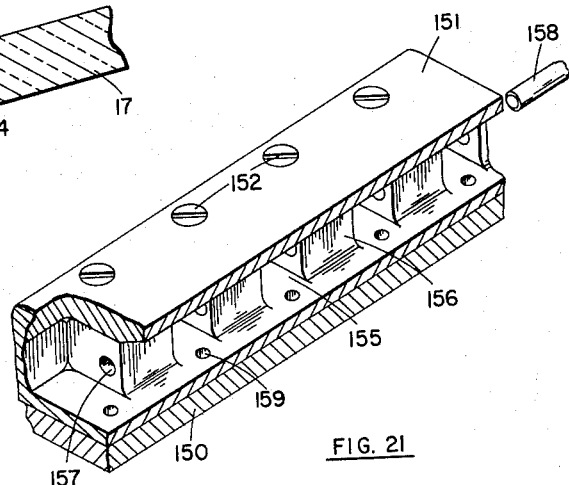
Figure 23:
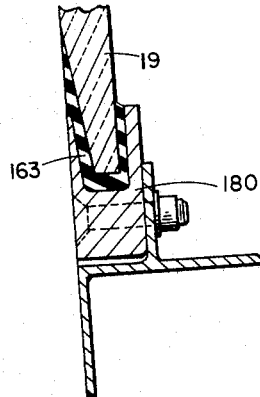
Figure 22:
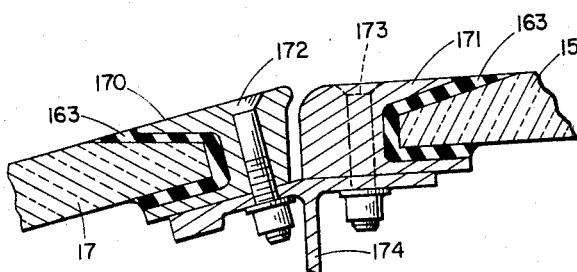
Figure 24:
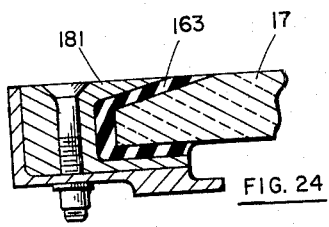
Figure 25:
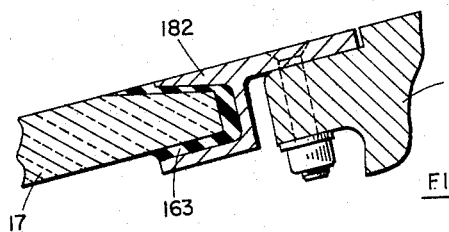
Figure 20:
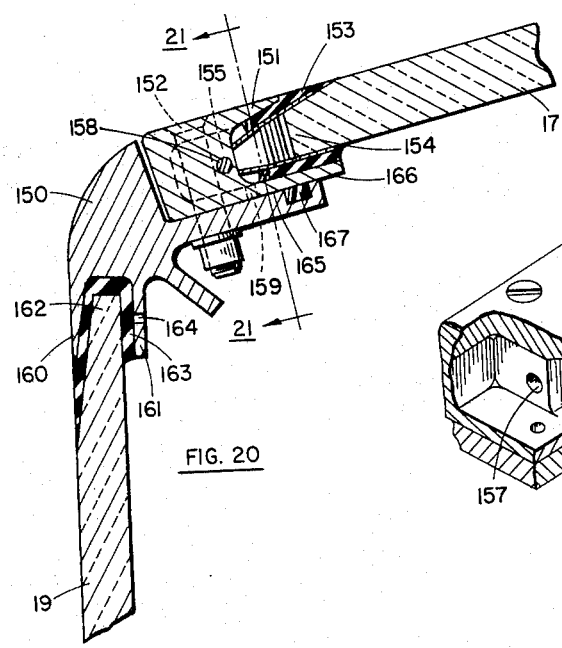
Figure 21:
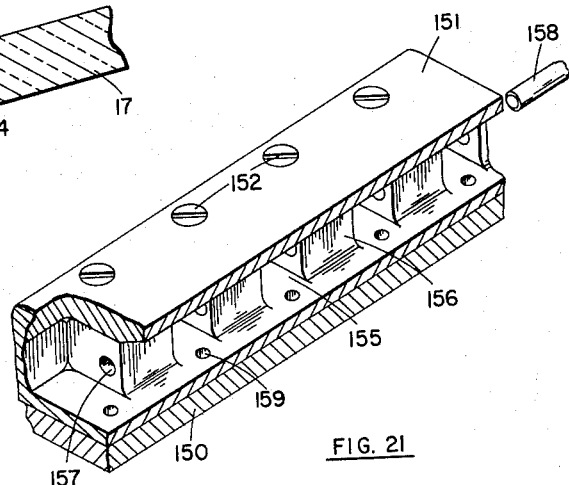
Figure 23:
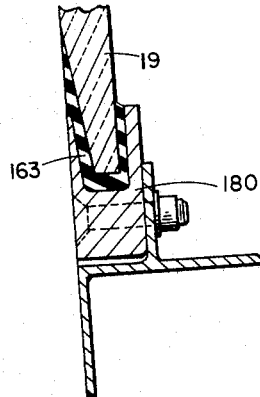
Figure 22:
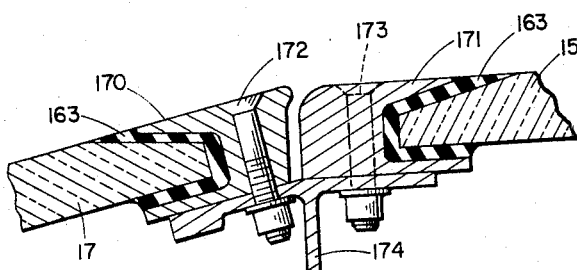
Figure 24:
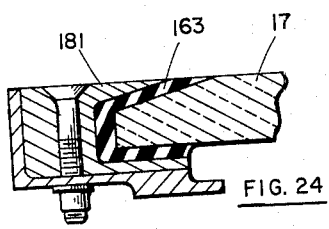
Figure 25:
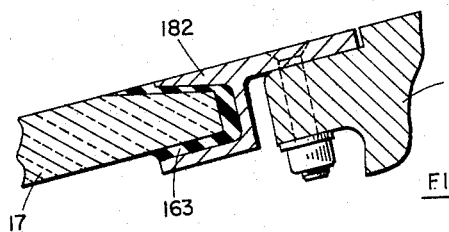

Other important objects and advantages of the instant invention will become apparent upon a close reading of the following detailed description of an illustrative embodiment of the invention, reference being had to the accompanying drawings wherein:

FIGURE 1 shows a general perspective view of a double windshield arrangement according to the inventive concept in this case with the outer windshield component separated from the inner windshield component for the sake of clarity, FIGURE 2 shows a side elevational view of the windshield of FIGURE 1 with the components in operative relationship and installed in an hypothetical vehicle, FIGURE 3 shows a fragmentary cross-sectional view of the structure of FIGURE 2 taken generally along line 3—3 of FIGURE 4, FIGURE 4 shows a plan view of the structure shown in FIGURE 2, FIGURE 5 is an isolated view of an illustrative embodiment of a panel edge attachment component adapted for use in mounting a panel according to the inventive principles disclosed in this case, FIGURE 6 is a cross-sectional view taken along line 6—6 of FIGURE 5, FIGURE 7 is a perspective view, partly in cross-section, taken along line 7—7 of FIGURE 1, FIGURE 8 is a cross-sectional view taken along line 8—8 of FIGURE 1, FIGURE 9 is a fragmentary view in cross-section taken along line 9—9 in FIGURE 1, FIGURE 10 is an isolated plan view of an edge attachment component of the type used in the structural arrangement shown in FIGURES 14, 15 and 16, FIGURE 11 is a fragmentary side elevational view of a glass panel structurally related to the component illustratively shown in FIGURE 10, FIGURE 12 is an isolated view in perspective of a modification of the panel attachment structure shown in FIGURE 10, FIGURE 13 is an exploded view, in perspective of a corner joint between two adjoining panels forming the inner windshield assembly shown in FIGURE 1, FIGURE 14 is an isolated view, in perspective, of the joint shown in FIGURE 13 but with the component parts in the assembled state, and taken along line 14—14 of FIGURE 1, FIGURE 15 is a fragmentary view in cross-section, of the joint shown in FIGURE 14, FIGURE 16 is a fragmentary view in cross-section, taken along line 16—16 shown in FIGURE 1, FIGURE 17 is a fragmentary view, partly in cross-section, showing edge attachment means between the vehicle structure and one of the glass panels of the inner windshield component shown in FIGURE 1, and taken along line 17—17 in the stated figure, FIGURE 18 shows edge attachment means for another glass panel of the inner windshield component shown in FIGURE 1, and taken along line 18—18 in the stated figure, FIGURE 19 is an enlarged detail fragmentary view of a corner joint of the windshield shown in FIGURE 1, FIGURE 20 is a fragmentary cross-sectional view showing edge attachment means between an upper and a side panel forming the outer windshield assembly shown in FIGURE 1, and taken along line 20—20 of the stated figure, FIGURE 21 is an isolated perspective view of a detail from the assembly shown in FIGURE 20, viewed generally as indicated by line 21—21 in FIGURE 20, FIGURE 22 is a fragmentary cross-sectional view of attachment structure between two other panels forming the outer windshield assembly shown in FIGURE 1, taken along line 22—22 of the stated figure, FIGURE 23 shows a cross-sectional view taken along line 23—23 of FIGURE 1, FIGURE 24 shows a cross-sectional view taken along line 24—24 of FIGURE 1, and FIGURE 25 is a cross-sectional view taken along line 25—25 of FIGURE 1, showing edge attachment means for connecting an upper panel in the outer windshield assembly of FIGURE 1 to adjacent vehicle structure.

Referring to the drawings described above and particularly to FIGURES 1, 2 and 3, it may be seen that the invention in this case contemplates a panel arrangement suitable for use in forming a windshield generally designated by reference numeral 1. Windshield 1 in essence comprises an inner windshield assembly 2 and an outer windshield assembly 4. As shown more particularly by FIGURES 2 and 3, inner windshield assembly 2 forms a wall portion of the pressurized cabin enclosure 6 adapted to accommodate a crew, and to isolate the pressurized barrier 6 from an intermediate pressure area 8 formed between windshield assemblies 2 and 4, while windshield assembly 4 separates intermediate area 8 from the outer ambient atmosphere surrounding vehicle 3.

Referring to FIGURE 1, it may be seen that inner windshield assembly 2 comprises a plurality of panels such as designated by reference numerals 10, 11, 12, 13 and 14, together with another panel not visible in FIGURE 1 but oppositely corresponding to side panel 13. Upper panels 10, 11 and 12 are structurally related to form a roof portion over pressurized area 6, while side panel 13 and elongate forward panel 14 combine with the remaining wall portions of the pressurized area to complete the crew enclosure. Outer windshield assembly 4 comprises center roof panel 15, adjoining side roof panels 16 and 17, and generally vertical sidewall panels 18 and 19. Inner windshield panels 10 through 14 are of laminate construction characterized by great strength and resistance to bending or other deflection under load as required to prevent leakage, distortion or structural failure resulting from forces applied to the panels when barrier 6 is pressurized and area 8 is at relatively low pressure. Panels 15 through 19 comprising outer windshield assembly 4 are preferably monolithic and characterized by less stiffness than that which would result from laminated construction. However, monolithic panels 15 through 19 are not subjected to such high differential pressures between area 8 and outer surrounding atmosphere as the pressure differential across panels 10 through 14 of inner windshield assembly 2, since area 8 is normally at a much lower pressure than area 6. Thus, the windshield arrangement shown generally in FIGURES 1, 2 and 3 essentially comprises a double-walled construction whereby in the inner wall, comprising inner windshield assembly 2, provides great strength and rigidity combined with relatively less surface area than outer windshield 4. The stated double-walled construction produces several extremely desirable advantages in ultra high speed vehicles, notably in regard to performance reliability combined with

*INVENTORS*
ANGELO P. MARTIGNONI, LESTER G. HALL
FREDERICK T. MCQUILKIN, JOHN R. BOETTO
HUGH G. MAXWELL, ROBERT B. MEADOWS
LEON PATTERSON

BY
ATTORNEY

tion to the structural elements described above, it will be understood that suitable vibration damping pads, seals and load distributing means corrresponding to laminated material 30, resilient pads 40 and seal 44 discussed hereinabove in connection with FIGURE 7, and operatively related to retainer elements 102 and 103, are included in the structure shown, for example, by FIGURES 14 and 15. In addition to the stated component parts, it may be seen particularly from FIGURE 15 that a plurality of elongate seals of suitable lightweight materials such as foam rubber and designated by reference numerals 121 and 122 are included in the joint envisioned by the stated figure. Thus, the manner of assembly for the joint shown in FIGURE 15 is substantially similar to that discussed above in connection with the joint shown in FIGURES 7 and 8, except that room temperature vulcanizing silicone rubber injected through holes 41 seen, for example, in FIGURE 14 is prevented from flowing beyond the contiguous portions of flanges 111, 112, pads 40 and glass panel 14 due to the location of rubber seals 44 and elongate seals 121 and 122 which may be preplaced in proper location during assembly of the joint components.

FIGURE 16 shows another type of joint incorporating tension transmitting means in the form of strap 80 and represents a typical cross-sectional view of the joints between glass panels 12 and 14 of inner windshield assembly 2. Thus, glass panel 14 is structurally joined to a retainer 125 generally similar in structure details to retainer 103, for example, described in detail above. A cooperatively related and functionally similar retainer element 126 supports glass panel 12 along a peripheral edge thereof and is secured to retainer element 125 at two spaced-apart locations comprising a pivotal hinge about rod 127 and a through-bolt 128. Retainer element 126 includes a pair of spaced-apart flanges 129 and 130 to which the edge portion of glass panel 12 is secured by suitable vibration damping and deflection load damping means. The stated means include shims or filler strips 30a and 30b corresponding generally with laminated material 30 discussed above in connection with FIGURES 6 and 7, for example. The stated damping means further includes a plurality of spaced-apart resilient pads 40a, 40b, and 40c, corresponding in shape, location, and function with pads 40 discussed in connection with FIGURE 7, for example. Rubber seals 44a and 44b are also provided as shown in FIGURE 16 corresponding with seal 44 shown in FIGURE 7. A suitable high temperature resistant sealant such as room temperature vulcanizing silicone rubber is forcibly injected into the spaces between pads 40a, 40b, and 40c in precisely the same manner as discussed hereinabove in connection with reference numeral 42 in FIGURE 7.

FIGURE 17 shows a typical cross-section through the joint between upper glass panel 14 and adjacent airframe structure at the aft edge of the panel. Laminated material 30 is secured to glass panel 14 and resilient pads 40a, 40b, and 40c are operatively related to the panel in the same manner as the corresponding components discussed above in connection with FIGURE 16, for example. Sealing means in the form of dams 44a and 44b correspond in function and structure with items 44a and 44b also discussed in connection with FIGURE 16. Adjacent airframe structure 132 supports glass panel 14 between confronting surfaces 133 and 134 as shown, for which purpose elongate guide or channel member 135 is secured to structure 132 by suitable means such as a plurality of bolts 136.

FIGURE 18 shows a typical cross-section through the edge attachment means supporting the lower edge of forward panel 14 of inner windshield assembly 2. The lower edge attachment means includes a plurality of channels or edge support braces 137, 138, and 139, structurally interrelated and secured to each other as seen from the stated figure. A plurality of resilient pads or strips 140a, 140b, and 140c are bonded to elements 137 and 138 as shown, and function in the same general manner as discussed above in connection with pads 40 shown in FIGURE 7, for example. Shims or filler strips 30 corresponding generally with laminated material 30 discussed above in connection with FIGURES 6 and 7, for example, is also provided in the structural arrangement shown by FIGURE 18 and serves a corresponding purpose. Teflon tape is also used in the arrangement shown by FIGURE 18 at the locations indicated by reference 141 and 142, and serves to provide waterproof and chemically-inert barriers between materials which might otherwise form an insufficient bond, or have other mutually deleterious effects. Moreover, an elongate sealing element 121 is provided in the arrangement shown by FIGURE 18 and functions in the manner discussed hereinabove in connection with corresponding elements 121 and 122 shown, for example, in FIGURE 15. A metallic cap 143 is further provided in the edge supporting structure shown by FIGURE 18, and functions to insure a moisture and pressure-proof barrier across the edge joint to prevent leakage from the area enclosed by inner windshield assembly 2. Also, a suitable sealant 44 is provided as shown in FIGURE 18, and functions in the same manner as sealant 44 discussed above in connection with FIGURE 7, for example.

FIGURE 19 shows an enlarged view of the corner detail formed between adjacent panels 12, 13 and 14 of inner windshield assembly 2 structurally interrelated as shown by FIGURE 1, for example. As discussed hereinabove in connection with FIGURE 13, panel 14 is secured to a retainer 103 having a hinge portion 104, while panel 13 is secured to retainer 102 having hinge portion 108. With the stated panels properly positioned to form the outer surfaces of inner windshield assembly 2, hinge portions 104 and 108 interengage with the holes through each stated portion in substantial alignment whereby rod 117 may be inserted from one end of the adjacent retainers 102 and 103 whereby rod 117 forms a holding means which maintains the retainers in the stated position of interengagement. The remaining joints forming the corner detail shown in FIGURE 19 conformed in essentially the same manner as discussed above in connection with retainers 102 and 103.

Turning now to outer windshield assembly 4 shown generally in FIGURES 1 through 4 and discussed briefly hereinabove, edge mounting means adapted to support panels 15–19 comprising assembly 4 may be seen in FIGURES 20 through 25, inclusive. FIGURE 20 shows attaching means between side roof panel 17 and generally vertical sidewall panel 19 which essentially comprises a pair of elongate support members in the form of channel pieces 150 and 151 secured to each other in proper structural relationship by suitable holding means such as a plurality of threaded nuts and bolts as indicated by reference numeral 152. Tension transmitting means between glass panel 17 and channel member 151 are provided in the form of tension strap 153 corresponding generally in structure and function with tension transmitting element 80 discussed hereinabove in connection with FIGURES 10 and 11, for example. Strap 153 is permanently secured along a peripheral edge 154 of panel 17 in the same manner and relationship as that discussed between strap 80 and panel 92. As shown more particularly by FIGURE 21, channel piece 151 is provided with a plurality of spaced-apart openings or cavities 155 separated by relatively thin-walled partitions 156, each partition having a hole 157 therein. Holes 157 are substantially in axial alignment whereby a pin 158 inserted at one end of channel piece 151 may be threaded through all of the holes 157. Strap 153 is provided with a plurality of slots corresponding with slots 86 discussed hereinabove in connection with FIGURE 10, for example, and which are adapted to interengage with partitions 156 whereby strap 153 may extend into cavities 155 and be retained in proper structural relationship with channel ture as set forth in the above objects having improved aerodynamic properties and lighter weight.

It is also an object in this case to provide improved mounting means for securing panels such as referred to in the objects set forth above to adjacent structure to form a pressure barrier of improved strength and economy of weight.

Also, it is an object of the invention disclosed herein to provide an improved arrangement of panels forming a lightweight pressure barrier in vehicles having relatively high pressure areas internally and relatively high temperatures on the outer surfaces of such vehicles during operation thereof.

It is an additional object in this case to provide improved mounting means such as referred to in the objects stated above which are permanently secured to panels such as referred to in the objects stated above in such relationship as to prevent chipping or other damage to the edges of such panels during shipment and handling thereof.

Other important objects and advantages of the instant invention will become apparent upon a close reading of the following detailed description of an illustrative embodiment of the invention, reference being had to the accompanying drawings wherein:

FIGURE 1 shows a general perspective view of a double windshield arrangement according to the inventive concept in this case with the outer windshield component separated from the inner windshield component for the sake of clarity, FIGURE 2 shows a side elevational view of the windshield of FIGURE 1 with the components in operative relationship and installed in an hypothetical vehicle, FIGURE 3 shows a fragmentary cross-sectional view of the structure of FIGURE 2 taken generally along line 3—3 of FIGURE 4, FIGURE 4 shows a plan view of the structure shown in FIGURE 2, FIGURE 5 is an isolated view of an illustrative embodiment of a panel edge attachment component adapted for use in mounting a panel according to the inventive principles disclosed in this case, FIGURE 6 is a cross-sectional view taken along line 6—6 of FIGURE 5, FIGURE 7 is a perspective view, partly in cross-section, taken along line 7—7 of FIGURE 1, FIGURE 8 is a cross-sectional view taken along line 8—8 of FIGURE 1, FIGURE 9 is a fragmentary view in cross-section taken along line 9—9 in FIGURE 1, FIGURE 10 is an isolated plan view of an edge attachment component of the type used in the structural arrangement shown in FIGURES 14, 15 and 16, FIGURE 11 is a fragmentary side elevational view of a glass panel structurally related to the component illustratively shown in FIGURE 10, FIGURE 12 is an isolated view in perspective of a modification of the panel attachment structure shown in FIGURE 10, FIGURE 13 is an exploded view, in perspective of a corner joint between two adjoining panels forming the inner windshield assembly shown in FIGURE 1, FIGURE 14 is an isolated view, in perspective, of the joint shown in FIGURE 13 but with the component parts in the assembled state, and taken along line 14—14 of FIGURE 1, FIGURE 15 is a fragmentary view in cross-section, of the joint shown in FIGURE 14, FIGURE 16 is a fragmentary view in cross-section, taken along line 16—16 shown in FIGURE 1, FIGURE 17 is a fragmentary view, partly in cross-section, showing edge attachment means between the vehicle structure and one of the glass panels of the inner windshield component shown in FIGURE 1, and taken along line 17—17 in the stated figure, FIGURE 18 shows edge attachment means for another glass panel of the inner windshield component shown in FIGURE 1, and taken along line 18—18 in the stated figure, FIGURE 19 is an enlarged detail fragmentary view of a corner joint of the windshield shown in FIGURE 1, FIGURE 20 is a fragmentary cross-sectional view showing edge attachment means between an upper and a side panel forming the outer windshield assembly shown in FIGURE 1, and taken along line 20—20 of the stated figure, FIGURE 21 is an isolated perspective view of a detail from the assembly shown in FIGURE 20, viewed generally as indicated by line 21—21 in FIGURE 20, FIGURE 22 is a fragmentary cross-sectional view of attachment structure between two other panels forming the outer windshield assembly shown in FIGURE 1, taken along line 22—22 of the stated figure, FIGURE 23 shows a cross-sectional view taken along line 23—23 of FIGURE 1, FIGURE 24 shows a cross-sectional view taken along line 24—24 of FIGURE 1, and FIGURE 25 is a cross-sectional view taken along line 25—25 of FIGURE 1, showing edge attachment means for connecting an upper panel in the outer windshield assembly of FIGURE 1 to adjacent vehicle structure.

Referring to the drawings described above and particularly to FIGURES 1, 2 and 3, it may be seen that the invention in this case contemplates a panel arrangement suitable for use in forming a windshield generally designated by reference numeral 1. Windshield 1 in essence comprises an inner windshield assembly 2 and an outer windshield assembly 4. As shown more particularly by FIGURES 2 and 3, inner windshield assembly 2 forms a wall portion of the pressurized cabin enclosure 6 adapted to accommodate a crew, and to isolate the pressurized barrier 6 from an intermediate pressure area 8 formed between windshield assemblies 2 and 4, while windshield assembly 4 separates intermediate area 8 from the outer ambient atmosphere surrounding vehicle 3.

Referring to FIGURE 1, it may be seen that inner windshield assembly 2 comprises a plurality of panels such as designated by reference numerals 10, 11, 12, 13 and 14, together with another panel not visible in FIGURE 1 but oppositely corresponding to side panel 13. Upper panels 10, 11 and 12 are structurally related to form a roof portion over pressurized area 6, while side panel 13 and elongate forward panel 14 combine with the remaining wall portions of the pressurized area to complete the crew enclosure. Outer windshield assembly 4 comprises center roof panel 15, adjoining side roof panels 16 and 17, and generally vertical sidewall panels 18 and 19. Inner windshield panels 10 through 14 are of laminate construction characterized by great strength and resistance to bending or other deflection under load as required to prevent leakage, distortion or structural failure resulting from forces applied to the panels when barrier 6 is pressurized and area 8 is at relatively low pressure. Panels 15 through 19 comprising outer windshield assembly 4 are preferably monolithic and characterized by less stiffness than that which would result from laminated construction. However, monolithic panels 15 through 19 are not subjected to such high differential pressures between area 8 and outer surrounding atmosphere as the pressure differential across panels 10 through 14 of inner windshield assembly 2, since area 8 is normally at a much lower pressure than area 6. Thus, the windshield arrangement shown generally in FIGURES 1, 2 and 3 essentially comprises a double-walled construction whereby in the inner wall, comprising inner windshield assembly 2, provides great strength and rigidity combined with relatively less surface area than outer windshield 4. The stated double-walled construction produces several extremely desirable advantages in ultra high speed vehicles, notably in regard to performance reliability combined with structural support means for supporting said panel, and removable elongate rod means including a rod insertable through said loop to connect said panel with said support means.

8. In an edge mounting arrangement for supporting adjacent panels each having a peripheral edge, retention means on each of said adjacent panels, said means comprising an elongate retainer element having a hinge portion, a bearing portion, and a web portion between said hinge and bearing portions, said web portion including means for structurally connecting said web portion of each said retention means in load transferring relationship with one of said panels, respectively, along said peripheral edge thereof, said hinge portion of each said retention means for hingeably joining each of said hinge portions together whereby said elongate retainer elements on said adjoining panels are hinged together, and said bearing portion of each said retention means including means for securing said bearing portions together in substantially fixed mutual relationship.

9. The structure set forth in claim 8 above, wherein: said hinge portions are hingeably joined together by an elongate hinge pin operatively joining said hinge portions and adapted for removal to permit disassembly of said retainer elements from each other.

10. The structure set forth in claim 8 above, wherein: said means for structurally connecting said web portions in load transferring relationship with the respective panel to which each is structurally related includes a thin gage metallic element for transmitting tension loads only between each of said web portions and said panels.

11. The structure set forth in claim 10 above, wherein: said means for structurally connecting each of said web portions with said panels further includes an elongate pin, and said thin gage metallic element is secured to said panel in spaced relationship from said edge thereof, said pin being adapted for insertion or removal from said space between said metallic element and said edge whereby each of said panels may be disconnected from its structurally related said web portion.

12. The structure set forth in claim 10 above, wherein: each of said elongate retainer elements includes a plurality of holes permitting injection of a semi-fluid sealant proximate said panel edge.

13. The structure set forth in claim 10 above, wherein: said means for hingeably joining each of said hinge portions together includes an elongate hinge pin removably insertable through each of said hinge portions.

14. The structure set forth in claim 13 above, wherein: said thin gage metallic element is formed with a plurality of elongate projections individually secured to said peripheral edge of said adjacent panels.

15. The structure set forth in claim 14 above, wherein: said elongate projections are adhesively secured to said panels, and said metallic element, said adhesive, and said panel have substantially the same thermal coefficient of expansion.

16. The structure set forth in claim 15 above, including:

anti-bending load concentration means for providing a relatively rounded edge along said peripheral edge of said panel, said last mentioned means comprising a plurality of layers of fiberglass cloth forming a laminated pad in close and substantially continuous contact with said edge.

17. A windshield assembly comprising:

a plurality of transparent panels each having a peripheral edge, a plurality of metallic retention members for supporting said panels, securing means for securing said retention members to said edges whereby a different one of said members is secured to each of said edges, said securing means including tension transmitting means whereby substantially all loads between said retention members and said panels is transmitted therebetween as tension load, resilient vibration damping materials structurally secured between each said member and each said edge for damping vibrations therebetween, and releasably securing means connected between adjacent pairs of said retention members for releasably joining together said adjacent members.

18. The structure set forth in claim 17 above, wherein: said tension transmitting means comprises a thin gage metallic element having a plurality of substantially parallel and spaced-apart finger like projections adhesively secured to said panel.

19. A windshield for a supersonic vehicle having a streamlined external contour and an interior crew enclosure containing substantially higher pressure than that exteriorly surrounding said vehicle, said windshield comprising:

a plurality of panels forming an inner windshield having surfaces exposed to said higher pressure within said interior crew enclosure.

a plurality of panels forming an outer windshield comprising a portion of said external contour and having surfaces exposed to said exteriorly surrounding pressure, said inner and outer windshields having a space gap therebetween, said inner windshield having elongate retention members secured to said panels along some of the confronting edges of said panels, securing means for securing said retention members to said edges, said securing means comprising a thin gage metallic element including a plurality of substantially parallel spaced-apart elongated projections joined to each of said panels and adapted to transmit as tension loads all loads between said retention members and the edge to which each of said retention members is respectively attached, resilient cushioning and pressure sealing means structurally secured between each said retention member and each said panel edge structurally related thereto for sealing and for damping vibration therebetween, releasable holding means for holding together adjacent pairs of said retention members secured to said confronting edges, said outer windshield panels each having peripheral edges and a metallic retention member secured to some of said edges, said outer windshield further having pressure sealing and vibration damping material secured between said edges and said metallic retention members on said outer windshield, said vibration damping material comprising room temperature vulcanizing silicone rubber, and said metallic retention members on said outer windshield panels including holes for injection of said rubber in the fluid state and further including releasable holding means for holding together adjacent pairs of said retention members on said outer windshield.

20. A pressure and temperature barrier comprising a transparent windshield for a supersonic vehicle having a streamlined external contour and an interior crew enclosure containing substantially higher pressure than the pressure exteriorly surrounding said vehicle, said windshield comprising:

a plurality of panels including at least one outer panel forming a portion of said external contour and at least one inner panel forming a portion of said crew enclosure, said outer panel being in spaced-apart relationship with respect to said inner panel resulting in a gap between said outer and inner panels, said outer panel having substantially larger area than said inner panel and having great resistance to high temperature, said outer panel comprising a layer of monolithic transparent material sloped relatively closer to a horizontal reference datum than said inner panel, said inner panel having substantially greater stiffness and resistance to area pressure loads than said outer panels, and said inner panel comprising laminated soda-lime glass.

21. Edge mounting means for a panel having opposed top and bottom surfaces and a peripheral surface generally normal to said opposed surfaces and intersecting said opposed surfaces along two generally parallel lines, said means comprising:

tension transmitting means secured to said panel for transmitting tension loads only into and out of said panel along an edge thereof, support means including at least one flange-like projection adapted to connect in load transferring relationship with said tension transmitting means to support said panel along said edge, said tension transmitting means comprising a thin gage metallic element secured to one of said opposed surfaces, and anti-bending load concentration means for providing a relatively rounded edge along said lines of intersection between said peripheral surface and said opposed surfaces, said anti-bending load concentration means comprising a plurality of layers of glass fiber cloth forming a laminated pad in close and substantially continuous contact with said peripheral surface.

22. Edge support means for a panel having a peripheral edge, said means comprising:

elongate retention means including a metallic retention member having a pair of substantially parallel spaced-apart flanges adapted to receive said panel edge therebetween, deflection load damping means situated between confronting portions of said retention means and said panel edge for damping loads on said panel caused by deflection of said retention means, said deflection load damping means including a plurality of layers of glass fiber cloth forming a laminated strip in close and substantially continuous contact with said panel, said deflection load means further including a plurality of spaced-apart resilient pads secured to said retention member and forming a relatively resilient cushion between said member and said panel, said retention member including holes therein intermediate said pads, and sealant material consisting of room temperature vulcanizing silicone rubber between said panel and said member, and intimately contacting said panel and said member, and completely filling all intersticial spaces between said pads, said panel, and said retention member.

23. Edge support means for a panel having a peripheral edge, said means comprising:

elongate retention means including a metallic retention member having a pair of substantially parallel spaced-apart flanges adapted to receive said panel edge therebetween, deflection load damping means situated between confronting portions of said retention means and said panel edge for damping loads on said panel caused by deflection of said retention means, said deflection load damping means including a plurality of layers of glass fiber cloth forming a laminated strip in close and substantially continuous contact with said panel, said deflection load damping means further including a plurality of spaced-apart resilient pads secured to said retention member and forming a relatively resilient cushion between said member and said panel, said retention member including holes therein intermediate said pads, said retention member comprising a hinge portion for hingeably joining said retention member to another retention member by a hinge pin, said one retention member further comprising a bearing portion for bearing against a portion of said other retention member in fixed relationship therewith, so that pivotal movement of either retention member about said hinge pin is prevented, holding means for holding said bearing portion in said fixed relationship, and sealant material between said panel and said member, and intimately contacting said panel and said member, and completely filling all the intersticial spaces between said pads, said panel, and said retention member.

24. A windshield assembly comprising:

a plurality of transparent panels each having a peripheral edge, a metallic retention member secured to each said edge, each said member having at least one hole for injection of sealant in the semi-fluid state, resilient vibration damping material comprising said sealant in the cured state structurally secured between each said member and each said edge for damping vibration therebetween, and releasable securing means connected between adjacent pairs of said retention members for releaseably joining together the same, said sealant comprising room temperature vulcanizing silicone rubber.

References Cited by the Examiner

UNITED STATES PATENTS

| | | | |
|---|---|---|---|
| 2,367,035 | 1/1945 | McConnell et al. | 244—121 |
| 2,696,451 | 12/1954 | Snyder | 244—129 |
| 2,730,777 | 1/1956 | Koriagin | 244—121 |
| 2,733,789 | 2/1956 | Tolle | 189—78 |
| 2,808,355 | 10/1957 | Christie et al. | 244—129 |
| 2,818,637 | 1/1958 | Roberts | 29—481 |
| 2,939,186 | 6/1960 | Norwood et al. | 244—121 X |
| 3,011,210 | 12/1961 | Wolfe | 244—129 |

FOREIGN PATENTS

| | | |
|---|---|---|
| 624,710 | 8/1961 | Canada. |

MILTON BUCHLER, *Primary Examiner.*

FERGUS S. MIDDLETON, *Examiner.*

D. P. NOON, L. C. HALL, *Assistant Examiners.*